United States Patent
Van Der Zande et al.

(10) Patent No.: US 12,033,358 B2
(45) Date of Patent: Jul. 9, 2024

(54) LUMINANCE DISTRIBUTION DETERMINATION

(71) Applicant: SIGNIFY HOLDING B.V., Eindhoven (NL)

(72) Inventors: Bianca Maria Irma Van Der Zande, Heeze (NL); Johan-Paul Marie Gerard Linnartz, Eindhoven (NL); Thijs Kruisselbrink, Eindhoven (NL); Alexander Rosemann, Eindhoven (NL); Rajendra Dangol, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 354 days.

(21) Appl. No.: 17/606,135

(22) PCT Filed: Apr. 28, 2020

(86) PCT No.: PCT/EP2020/061737
§ 371 (c)(1),
(2) Date: Oct. 25, 2021

(87) PCT Pub. No.: WO2020/221731
PCT Pub. Date: Nov. 5, 2020

(65) Prior Publication Data
US 2022/0207777 A1     Jun. 30, 2022

(30) Foreign Application Priority Data

Apr. 30, 2019  (EP) ................................... 19171830

(51) Int. Cl.
*G06T 7/90*    (2017.01)
*G06T 5/50*    (2006.01)
*G06T 5/92*    (2024.01)

(52) U.S. Cl.
CPC .................. *G06T 7/90* (2017.01); *G06T 5/50* (2013.01); *G06T 5/92* (2024.01);
(Continued)

(58) Field of Classification Search
CPC .... G06T 7/90; G06T 5/92; G06T 5/50; G06T 2207/10024; G06T 2207/20208; G06T 2207/20212
See application file for complete search history.

(56) References Cited

U.S. PATENT DOCUMENTS

| | | | | |
|---|---|---|---|---|
| 7,880,773 | B2 * | 2/2011 | Abe ..................... | H04N 25/134 |
| | | | | 348/224.1 |
| 8,780,225 | B2 * | 7/2014 | Bai ........................ | H04N 1/409 |
| | | | | 348/223.1 |

(Continued)

FOREIGN PATENT DOCUMENTS

| | | |
|---|---|---|
| CN | 108509887 A | 9/2018 |
| EP | 2582125 A1 | 4/2013 |

(Continued)

OTHER PUBLICATIONS

Kruisselbrink, et al., "A Practical Device for Measuring the Luminance Distribution", Jour. Sustainable Lighting, pp. 1-15, Jun. 2017.

(Continued)

*Primary Examiner* — Utpal D Shah

(57) ABSTRACT

A method and computer device for determining a spatial luminance distribution over at least one image of a scene illuminated by at least one illuminant (121) are provided. The image comprises RGB channels. A linear combination of the RGB channels is applied to determine the luminance distribution. The linear combination has a set of coefficients comprising a respective coefficient for each of the RGB channels. The coefficients are determined by identifying a spectral power distribution, SPD, of the at least one illuminant and performing a search to determine values of the set (Continued)

of coefficients that minimise a spectral mismatch between: a) the identified SPD weighted by the linear combination; and b) the identified SPD weighted by a luminosity function.

15 Claims, 8 Drawing Sheets

(52) U.S. Cl.
CPC ............. *G06T 2207/10024* (2013.01); *G06T 2207/20208* (2013.01); *G06T 2207/20212* (2013.01)

(56) References Cited

U.S. PATENT DOCUMENTS

| | | | | |
|---|---|---|---|---|
| 9,478,173 | B2* | 10/2016 | Safaee-Rad | H04N 9/69 |
| 9,609,721 | B1* | 3/2017 | Hutz | H05B 45/10 |
| 2002/0021292 | A1* | 2/2002 | Sakashita | H04N 9/3105 |
| | | | | 345/204 |
| 2005/0069201 | A1* | 3/2005 | Speigle | H04N 1/6077 |
| | | | | 382/167 |
| 2006/0082665 | A1 | 4/2006 | Mizukura et al. | |
| 2010/0053222 | A1* | 3/2010 | Kerofsky | G09G 3/3406 |
| | | | | 345/690 |
| 2013/0300894 | A1* | 11/2013 | Imai | H04N 23/80 |
| | | | | 348/229.1 |
| 2013/0307419 | A1 | 11/2013 | Simonian et al. | |
| 2014/0085534 | A1 | 3/2014 | Bergquist | |
| 2017/0352137 | A1 | 12/2017 | Van Der Vleuten et al. | |
| 2018/0168015 | A1 | 6/2018 | Casey et al. | |
| 2019/0045163 | A1 | 2/2019 | Nikkanen et al. | |
| 2024/0069260 | A1* | 2/2024 | Di Trapani | G02B 5/003 |

FOREIGN PATENT DOCUMENTS

EP 3383017 A1 10/2018
WO 2015081051 A1 6/2015

OTHER PUBLICATIONS

Kruisselbrink, et al., "Photometric Measurements of Lighting Quality: An Overview", Building and Environment, vol. 138, pp. 42-52, Apr. 2018.

* cited by examiner

LUMINANCE DISTRIBUTION DETERMINATION

CROSS-REFERENCE TO PRIOR APPLICATIONS

This application is the U.S. National Phase application under 35 U.S.C. § 371 of International Application No. PCT/EP2020/061737, filed on Apr. 28, 2020, which claims the benefit of European Patent Application No. 19171830.3, filed on Apr. 30, 2019. These applications are hereby incorporated by reference herein.

TECHNICAL FIELD

The present disclosure relates to determining a luminance distribution.

BACKGROUND

The overall lighting present within an environment may be largely influenced by a controllable lighting system comprising one or more illuminants. There may be other sources of light within the environment such as natural light incident through a window. In general, the overall lighting may comprise controllable (part of the lighting system) and non-controllable (not part of the lighting system) components.

In order to achieve high-quality lighting, a controller of the lighting system should account for lighting quality aspects within the environment such as lighting distribution, directionality, dynamics, glare, melanopic equivalent daylight illuminance, spectral power density in visual and non-visual parts of the spectrum (from UV up to IR) etc. To do so, a useful first step is to measure a luminance distribution within the environment because the luminance distribution contains a lot of significant information for these lighting quality aspects and can provide sufficient information to achieve high-quality lighting. Hence, luminance distribution measurement devices are useful devices for lighting quality control systems.

A luminance distribution measurement device may also have other applications such as a stand-alone measurement device, e.g. to ensure the illumination in a workspace plane meets certain standards.

CN 108509887 A relates to the technical field of display, and particularly displays a method and a device for obtaining ambient illumination information, and electronic equipment. The disclosed method comprises the following steps that: cutting the color image, which is really shot, of a reference object from an image which contains the reference object; according to the color image of the reference object, generating an observation point matrix through sampling; according to a linear equation set formed by a light source primary function coefficient, a transfer matrix and the observation point matrix, solving the light source primary function coefficient; and according to the light source primary function coefficient, obtaining ambient illumination information. Through the method, the illumination information of a surrounding environment can be accurately and efficiently calculated, which is a prerequisite for realistically rendering virtual objects in a real environment under real illumation conditions.

SUMMARY

According to a first aspect disclosed herein, there is provided a method of determining a spatial luminance distribution over at least one image of a scene illuminated by at least one illuminant, the image comprising RGB channels, the method comprising: forming a combination of the RGB channels to determine the luminance distribution, the combination having a set of coefficients comprising a respective coefficient for each of the RGB channels; wherein the coefficients are determined by: identifying a spectral power distribution, SPD, of the at least one illuminant; and performing a search to determine values of the set of coefficients that minimise a spectral mismatch between: a) the identified SPD weighted by the combination; and b) the identified SPD weighted by a luminosity function.

In an example, the at least one image comprises a set of low dynamic range, LDR, images and the method comprises constructing a high dynamic range, HDR, image from the set of LDR images, and wherein the combination is applied to the constructed HDR image.

In an example, the identifying of the spectral power distribution comprises determining a gamut of the at least one image and comparing the determined gamut with a set of predefined gamuts for known spectral power distributions.

In an example, the gamuts are red-blue gamuts.

In an example, identifying the spectral power distribution comprises receiving a predetermined indication of the spectral power distribution.

In an example, the combination is a linear combination.

In an example, the method comprises determining at least one Light Performance Indicator LPI from the luminance distribution, the LPI being a combined metric derived from an area of the luminance distribution.

In an example, at least one of the LPIs is a luminance LPI indicating a luminance value over an area of the luminance distribution In an example, at least one of the LPIs is a contrast LPI indicating a difference in luminance over an area of the luminance distribution.

In an example, the method comprises identifying an orientation of a user, and wherein at least one of the LPIs is determined for an area of the luminance distribution corresponding to an area located in front of the user.

In an example, at least one of the LPIs is a glare LPI indicating an amount of glare experienced by a user, and the method comprises determining the glare value by: determining, from the luminance distribution, a background luminance and a luminance of a source of glare; estimating a deviation of the source of glare from a line of sight of the user; estimating a solid angle subtended by the source of glare from the user; determining the amount of glare based on the background luminance, the luminance of the source of glare, the estimated deviation of the source of glare from the line of sight of the user, and the estimated solid angle subtended by the source of glare from the user.

In an example, at least one of the LPIs is a non-visual LPI indicating an expected non-visual effect on a user.

In an example, the method comprises identifying a plurality of task areas within the luminance distribution, and determining an LPI for each respective task area.

In an example, the method comprises controlling the at least one illuminant based on the determined at least one LPI.

Also provided is a computer device comprising computer-executable code embodied on a computer-readable storage medium configured so as when executed by one or more processors to perform the method the first aspect or any example thereof.

Also provided is a system comprising the computer device and the camera.

Also described is a camera-based sensor device for use in a controllable lighting system, the camera-based sensor comprising: a communications interface; a camera for capturing images of a scene, each image comprising an array of pixels; and a processor configured to: determine at least one light performance indicator, LPI, from an image captured by the camera, the LPI being a combined metric derived from a plurality of pixels of the array of pixels in the image; and transmit, via the communications interface, the determined at least one LPI to the controllable lighting system for use by the controllable lighting system to make a control decision based on the LPI; wherein the processor does not transmit any of the images of the scene.

In an example, at least one of the LPIs is a brightness LPI indicating a brightness value over a plurality of pixels in an image captured by the camera.

In an example, at least one of the LPIs is a contrast LPI indicating a difference in brightness over a plurality of pixels in an image captured by the camera.

In an example, at least one of the LPIs is a colour LPI indicating a colour value over a plurality of pixels in an image captured by the camera.

In an example, the colour may be a colour temperature.

In an example, at least one of the LPIs indicates a combination of brightness or luminance with colour or colour temperature. In a specific example, the LPI may indicate the location of the combination with respect to the Kruithof curve.

In an example, at least one the LPIs is a colour contrast LPI indicating a difference in colour over a plurality of pixels in an image captured by the camera.

In an example, at least one of the LPIs is a non-visual LPI indicating an expected non-visual effect on a user present within the scene. Examples of non-visual effects include melanopic radiance; s-cone-opic radiance; m-cone-opic radiance; l-cone-opic radiance; and rhodopic radiance.

In an example, the processor is configured to determine the location and orientation of a user present within the scene, and wherein at least one of the LPIs is a glare LPI indicating an amount of glare experienced by the user.

In an example, the processor is configured to determine a luminance distribution from the array of pixels, and wherein at least one of the LPIs is a luminance LPI indicating a luminance value over a plurality of pixels in an image captured by the camera.

In an example, the scene comprises a plurality of task areas, and an LPI is determined for each respective task area.

In an example, the processor is configured to determine an LPI for each of a plurality of users present within the scene.

In an example, the processor is configured to determine an LPI of the same type for each of a plurality of assumed user locations within the scene and generate an average LPI from the plurality of LPIs.

In an example, the processor is configured to determine a current activity being performed by a user present within the scene, and wherein at least one LPI is dependent on the determined current activity.

Also described is a method of controlling a controllable lighting system, the method comprising: capturing an image of a scene using a camera, the image comprising an array of pixels; determining at least one light performance indicator, LPI, from the image captured by the camera, the LPI being a combined metric derived from a plurality of pixels of the array of pixels in the image; and transmitting the determined at least one LPI and not the image from the camera to the controllable lighting system for use by the controllable lighting system to make a control decision based on the LPI.

In an example, the method comprises: receiving the at least one LPI at a controller of the controllable lighting system; comparing the received at least one LPI with a corresponding user preference to determine a setting for a device in the controllable lighting system; and controlling the device in accordance with the determined setting.

In an example, the method comprises determining a user satisfaction with the setting for the device in the controllable lighting system; and modifying the corresponding user preference accordingly.

BRIEF DESCRIPTION OF THE DRAWINGS

To assist understanding of the present disclosure and to show how embodiments may be put into effect, reference is made by way of example to the accompanying drawings in which.

DETAILED DESCRIPTION

Figure 1:
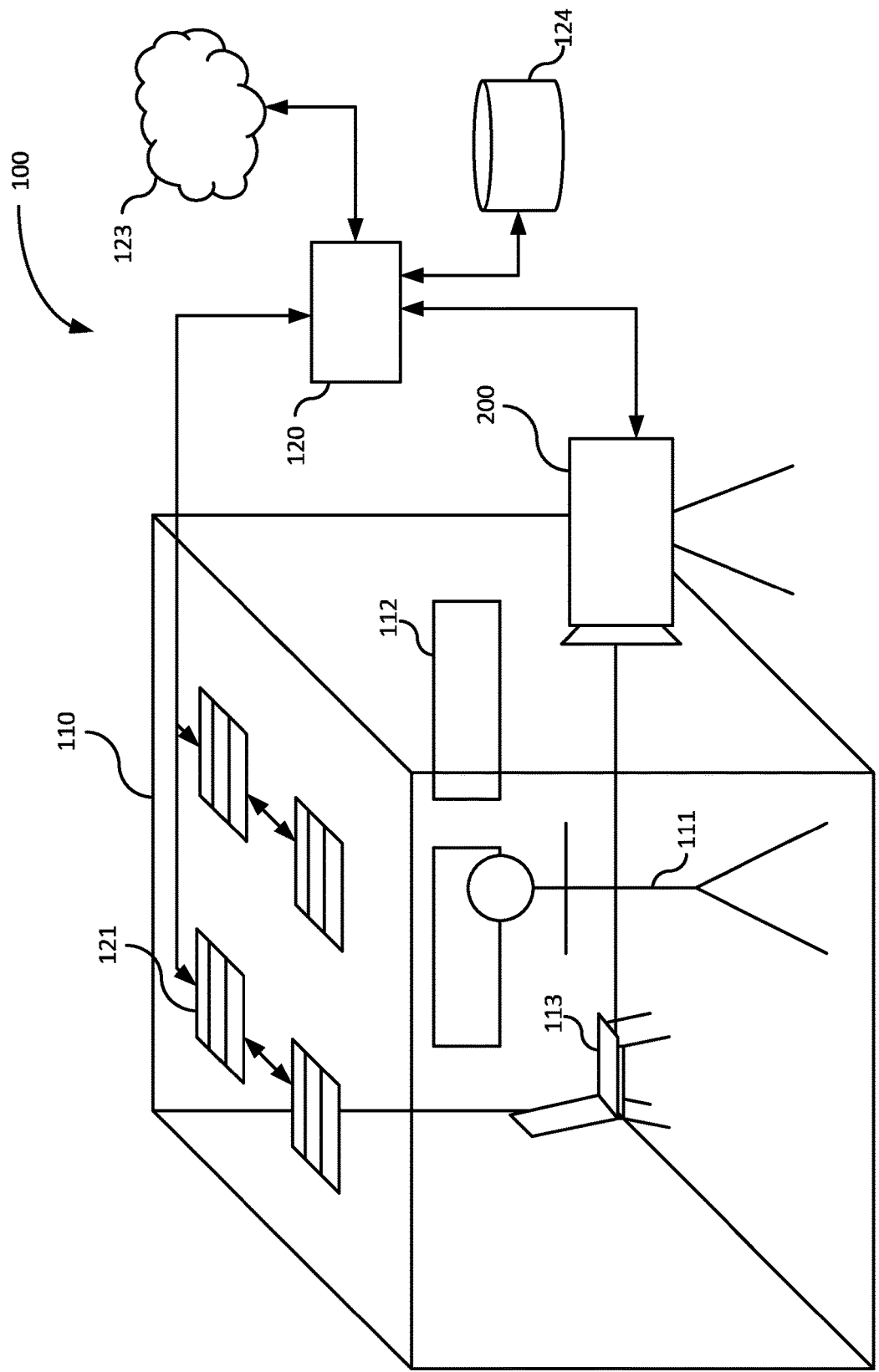
FIG. 1 shows schematically an example lighting system for illuminating an environment.

People nowadays spend more than 90% of their time indoors and, as such, the indoor environment becomes paramount for people's health and wellbeing. Therefore, healthy building design is becoming more and more an agenda point for building owners, regulation bodies and tenants. The trend for healthy building design is suggested to rapidly grow. Given the beneficial effects of daylight, artificial lighting schemes that reflect its natural rhythm and provide the light nutrition required to support health and wellbeing are key for the creation of context-aware healthy indoor environments. Sensing and monitoring of the lighting is therefore very important.

Controllable lighting systems allow the illumination within an environment to be controlled in response to inputs from various sensors. It is recognised herein that a camera-based sensor which captures images of an environment can lead to privacy or security concerns. This is a particular problem because camera-based sensors can provide many advantages over other types of sensor, e.g. infra-red motion detectors, due to the fact that they provide spatial information.

The present disclosure describes devices and methods allowing the use of a camera-based sensor while maintaining user privacy and data security. To achieve this, one or more "Light Performance Indicators" (LPIs) are derived at the camera unit (camera-based sensor device). The LPIs are derived from one or more images taken by a camera at the camera unit, and contain information necessary for a controller of the lighting system to make control decisions. Each LPI is a combined metric derived from a plurality of pixels from the array of pixels in the image. In other words, the LPIs only contain a limited number of identifiers, and no traceable pictures of humans or their activities. These LPIs, and not the images, are then transmitted from the camera unit to the controller. That is, the images themselves never leave the camera unit, thereby providing enhanced privacy and security In other words, two steps are performed:

Step 1: translate the measured light distribution into LPIs which are calculated inside the camera unit;

Step 2: use an optimization function/cost function to calculate how a different light setting can improve the values of the LPIs. This can be done outside the camera unit.

The camera unit thus has an interface across which it does not exchange images, but it exchanges LPIs. In other words, the communications interface of the camera unit defines a privacy boundary over which the images are never exchanged. In an example, a camera unit is provided in the form of an integrated camera-based sensor device in which the camera and communications interface (along with a processor and memory, described below) are integrated into the same housing. In these examples, the communications interface is arranged to communicate LPIs (and not images) from the integrated camera-based sensor device to an external system such as the controllable lighting system.

Some examples of LPIs may make use of information relating to a luminance distribution within the environment. Known devices that measure the luminance distribution within an environment are expensive, purpose-built devices. Even when using such a device, the individual steps to determine the luminance distribution from the raw measurements need to be conducted manually. This requires an expert level of skill. Both of these factors have limited the uptake of luminance distribution measurement devices.

The present disclosure also describes device and methods for allowing the determination of a luminance distribution from the one or more images captured by the camera. This allows a practical accuracy to be maintained while in embodiments requiring only low cost, standard components. Furthermore, the luminance distribution measurement can be completely automated. This allows it to be easily integrated into a lighting control system.

FIG. 1 shows schematically an example lighting system 100 for illuminating an environment 110. The environment 110 may be, for example, a room bounded by walls. A user 111 is shown within the environment 110.

The lighting system 100 comprises a controller 120, one or more illuminants 121, and a camera unit 200. The controller 120 is operatively coupled to each of the illuminants 121 and the camera unit 200 by respective wired or wireless connections. The controller 120 may also be connected to a network 123 as shown in FIG. 1. An example of a network is the Internet. The controller 120 may also be connected to a memory 124. The memory 124 is a computer storage device. The memory 124 may be directly coupled to the controller 120 (i.e. a local memory) as shown in FIG. 1, or may be a remote memory accessible via the network 123. For example, the memory 124 may be a server accessible by the controller 120 via the Internet.

The illuminants 121 are sources of light (also called luminaires) for generating light. The controller 120 is configured to send control commands to the illuminants 121 in order to control the lighting within the environment 110. As shown in FIG. 1, the illuminants 121 are disposed within an environment 110. That is, each illuminant 121 is arranged to illuminate at least part of the environment 110 by emitting visible light into the environment 110. In this example, there are four illuminants 121 shown which are ceiling-mounted illuminants. However, it is understood that greater or fewer illuminants may be present within the environment 110. It is also appreciated that different types of illuminants may be present. Examples of other types of illuminant include floor-mounted lamps, desk lamps, spotlights, etc. Not all the illuminants 121 need be of the same type.

The environment 110 may comprise one or more sources of light which are not themselves part of the lighting system 100. An example of such a light source is a natural light source, e.g. a window 112 as shown in FIG. 1. The controller 120 may still control the influence of these types of light sources using other types of controllable device. An example is a controllable shade or blind for a window 112. The controller 120 may be configured to control the shade or blind to cover or uncover the window in order to alter the amount of natural light entering through the window 112.

The controller 120 is described herein as performing functionality relating to both identifying and remedying an issue with the lighting within the environment 110. However, it is understood that these steps may be performed by separate devices within the lighting system 100. Specifically, the controller 120 may, in some examples, only identify a lighting issue (e.g. the illumination is too bright) and pass responsibility for remedying it off to a separate control device. One reason for doing so is that a remedy for the lighting issue may be desirable but not achievable due to, e.g., power consumption restraints. In this example, the controller 120 may be configured to determine desirable changes to a lighting setting (e.g. increase the brightness) without the need to be aware of non-lighting-based requirements (e.g. limited power consumption) which may prevent it being enacted.

Note that "brightness" may be taken to be simply the magnitude of one or more of the RGB values in an image. However, a better measure of the "brightness" experienced by the user 111 is luminance. Described below is a method for determining luminance values (a luminance distribution) from an image. Hence, a (more sophisticated) luminance value may be used instead of the (more naïve) brightness value.

The environment 110 may contain one or more objects 113. FIG. 1 shows a chair placed within the environment 110. The chair is an example of an object 113. Different objects respond to light emitted by the illuminants 121 in different ways, by absorbing and reflecting different wavelengths to different degrees.

Figure 2:
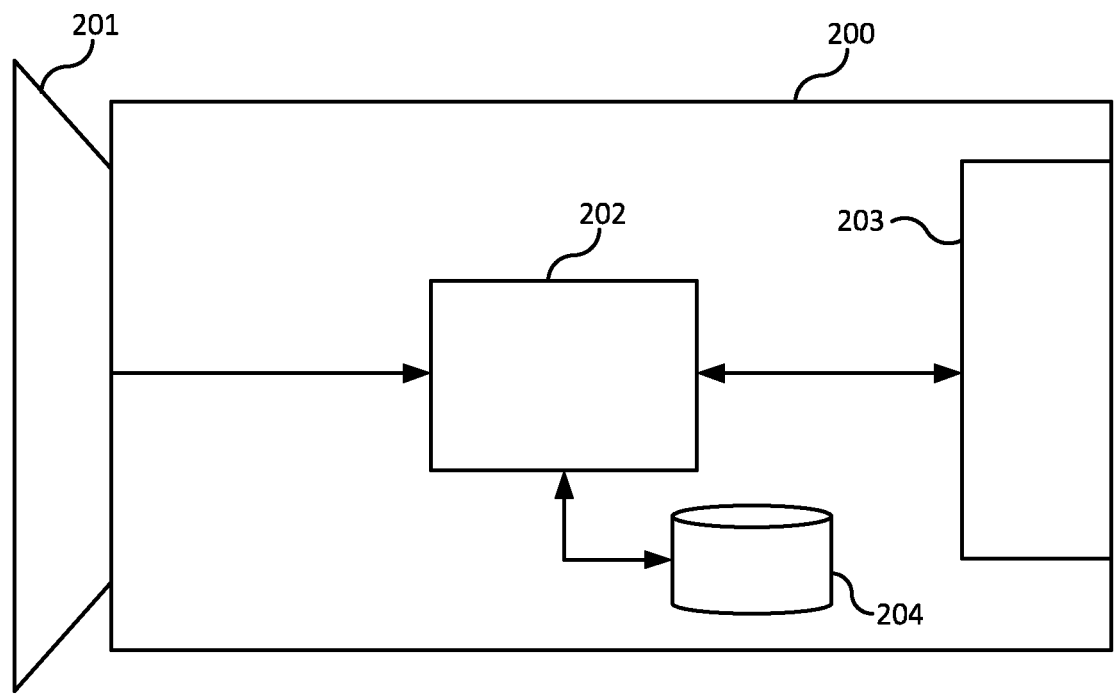
FIG. 2 shows schematically a camera unit of the lighting system in more detail.

FIG. 2 shows schematically the camera unit 200 of the lighting system 100 in more detail.

The camera unit 200 comprises a camera 201, a processor 202, a communications interface 203, and an internal memory 204. The processor 202 is operatively coupled to each of the camera 201, communications interface 203, and internal memory 204.

The camera 201 is arranged to capture images of a scene within the environment 110. The term "scene" refers to the part of the environment 110 which is captured in the images, i.e. the part of the environment 110 within the field of view of the camera 201. Note that the camera unit 200 may be placed inside or outside of the environment 110 itself. In either case, the camera 201 may be a wide-angle camera. An advantage of a wide-angle camera is that the resulting images are representative of a large area of the environment 110 (a larger scene). The scene captured by the camera 201 may be substantially all of the environment 110. For example, the camera 201 may be a wide-angle camera mounted in the ceiling with a 360 degree view of the environment 110. The terms "scene" and "environment" are used interchangeably herein.

The camera 201 captures RGB images. An RGB image is represented in an RGB colour space by individual values for each of a red R, green G, and blue B channel. That is, the images captured by the camera 201 comprise, e.g. floating-point, RGB values for each pixel, as known in the art. Each channel comprises an array of scalar (greyscale) pixel values. For example, the red channel comprises a greyscale image representing the response of the red sensors of the camera 201 at each point in the image.

As described in more detail below, the processor 202 of the camera unit 200 is configured to receive images from the camera 201 and convert them into one or more Light Performance Indicators (LPIs). The LPIs are transmitted to the controller 120 of the lighting system 100 instead of the images themselves. The LPIs contain information used by the controller 120 in making control decisions. In other words, the processor 202 is configured to "strip down" the information (the images) into a format which is still useful to the controller 120, but does not have the privacy concerns associated with an image.

Each LPI is a measure of how a human experiences of a lighting condition present within the scene, e.g. brightness, glare, contrast, colour, etc. An LPI may be determined using a function that models the human experience of the lighting condition, e.g. a function over values taken from each of the RGB channels. The function may, for example, take a combination of the RGB values for each pixel, each parameterised by a respective parameter (e.g. each weighted by a respective coefficient). The processor 202 may perform a training or searching process to tune the parameters or coefficients to identify values that best model the human experience, e.g. minimise a spectral mismatch between the response of the camera system and the human eye.

Each LPI is essentially a measure or metric relating to how a human experiences the illumination. Various examples are described herein, but it is understood that this is not an exhaustive list. In particular, many of the examples are given with quantified models. However, the inventors envision that, in the future, for more examples, quantified models will be proposed and validated. For many examples the performance is expressed in numerical values, sometimes as a probability that the human deems the light level acceptable, the probability that the room user will intervene with the light settings, subjective interpretations are quantified, mean satisfaction scores, the productivity of workers in solving certain tasks for specific light settings, the reading speed in words per second, the extent to which people with medical indications and disability can still safely perform tasks, the expected rate at which people show fatigueless, etc. While it may be possible to determine some of these factors in well-conditioned lab settings, this requires an expert level of skill and careful control of the variables involved (e.g. setting the light to create certain test conditions). Techniques described herein address the particular problem of determining or predicting LPIs purely on light distributions measured by a camera. This may involve other inputs such as user specific inputs (position, orientation, etc.). Adequate models allow the calculation of many LPI numerically by an automated system.

Figure 3:
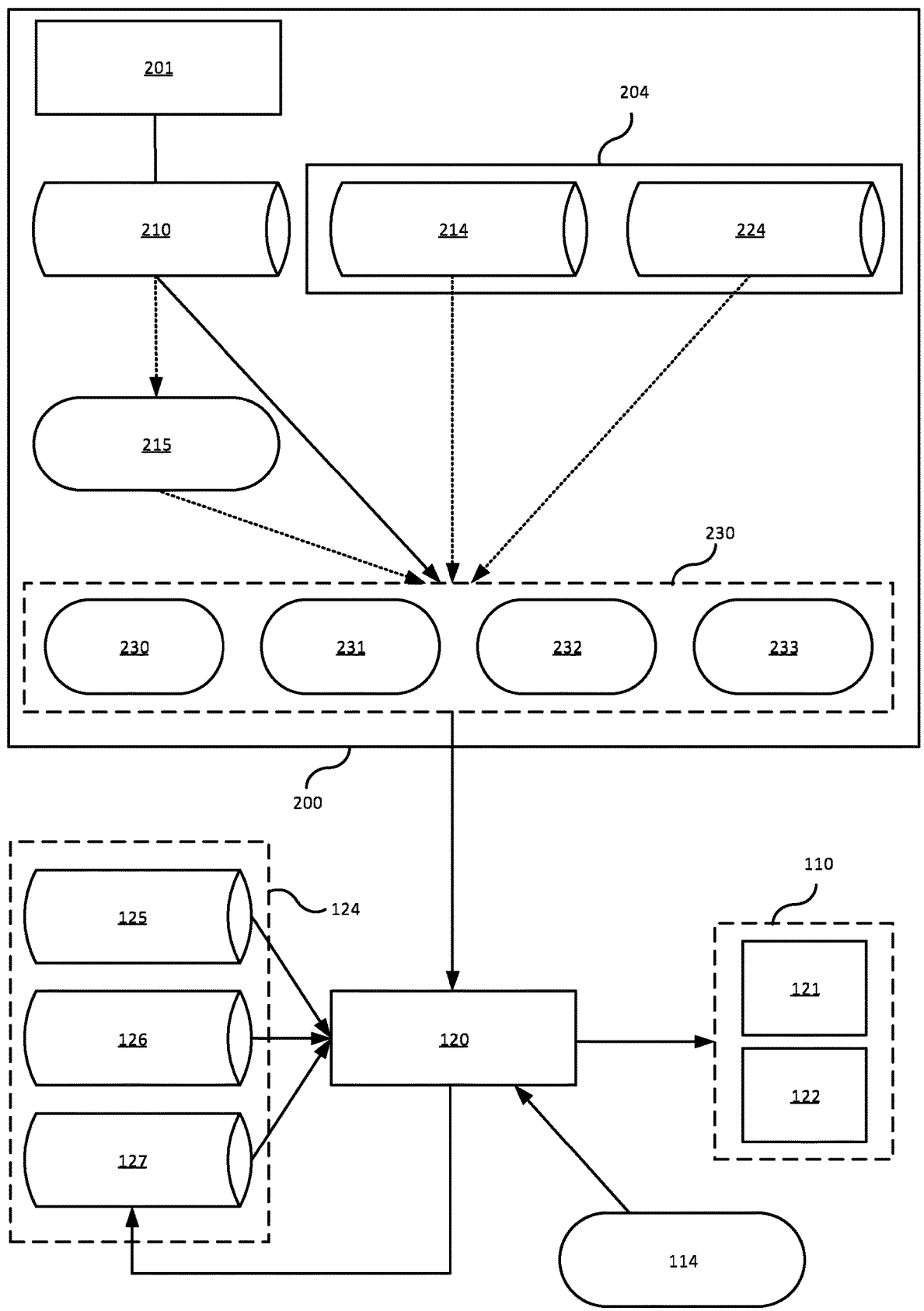
FIG. 3 is a diagram illustrating the high-level functioning of the lighting system in accordance with examples described herein.

FIG. 3 illustrates the high-level functioning of the lighting system 100 in accordance with examples described herein.

FIG. 3 shows the camera unit 200 comprising camera 201, images 210 captured by the camera 201, luminance distribution 215, example LPIs 230, and memory 204. The memory 204 is shown storing user data 214 and environment data 224. Examples of user data 214 include user position, user orientation, user gaze, etc. Examples of environment data include task areas, wall areas, etc. The example LPIs include overall brightness 230, glare 231, task area lighting 232, wall lighting 233, etc.

FIG. 3 also shows the memory 124, controller 120, and environment 110. The memory 124 is shown storing user data 125, lighting system data 126, and user preference data 127. Examples of user data 125 include user activity. Examples of lighting system data 126 include illuminant positions and illuminant orientations. The environment 110 is shown comprising illuminants 121 and also other controllable devices 122. Examples of other controllable devices 122 include shades and blinds covering windows 112. Also shown is user input 114. Examples of user input include explicit and implicit user input. These are explained in more detail below. Examples of ways in which the user may provide input to the controller 120 include via switches (e.g. wall-mounted), via smartphone or smartwatch, etc.

As mentioned above, the processor 202 is configured to determine one or more LPIs from at least an image captured by the camera 201. Note that only some example LPIs are shown in FIG. 3. A larger list of example LPIs is given later below.

In some examples, the processor 202 may take additional factors into account when determining one or more of the LPIs. FIG. 3 shows two broad categories of such additional factors: environment data and user data.

Environment data refers to information relating to the environment 110. Examples of environment data include the position and optionally orientation of areas of interest within the environment 110. For example, a "task area" may be an area of interest. A task area is an area in which the user 111 or other user(s) typically perform tasks, e.g. a desk area. The lighting requirements of a task area are typically different from the lighting requirements of other areas within the environment 110. For example, the user 111 may wish for his or her desk (task area) to be lit with a greater brightness than the rest of the environment 110.

User data refers to information relating to the user, such as the user's physical attributes. Examples of user data are user position data, user orientation data, user gaze direction, etc.

Other data may also be taken into account by the processor 202 when determining one or more of the LPIs. Examples include occupancy of the environment 110, facial recognition, eye-tracking, etc.

The environment data, user data, and other data may be a) predetermined and stored to a memory such as memory 204; b) determined by an external sensor and received by the processor 202; c) determined by the processor 202 from one or more images captured by the camera 201; or d) a combination of one or more of these. In particular, techniques for determining the position and/or orientation of a user using one or more sensor devices are known in the art, e.g. using data captured by a computer device (such as a smartphone) of the user.

Even when the processor 202 cannot determine the location and/or orientation of the user 111, the processor 202 can still determine the one or more LPIs for a number of "hypothetical" user positions and determine an average LPI over these "hypothetical" positions. In other words, the memory 204 may store an indication of one or more predetermined user positions within the environment 110. The processor 202 may be configured to retrieve one of these predetermined user positions from the memory 204 and use the retrieved position as described herein. In other examples, the processor 202 may be configured to retrieve a plurality of predetermined user positions from the memory 204. In such cases, the processor 202 may use each retrieved position to determine one or more LPIs, and average the resulting plurality of LPIs in order to determine a single output LPI for providing to the controller 120.

The predetermined user positions may be stored to the memory 204 during a commissioning process. For example, a commissioner may determine the user positions to be used in such an event that the processor 202 cannot determine a current (actual, real life) user position. The predetermined user positions may correspond to locations within the environment 110 which are more likely to be occupied by a user. An example of such a location is a desk. Hence, in one example, the predetermined user positions correspond to positions of the desks within the environment 110.

The memory 204 may also be configured with one or more predetermined user orientations in a similar manner to that described above in relation to predetermined user positions. The processor 202 may then similarly use one or more of the predetermined user orientations when it is unable to otherwise determine a current (actual, real life) user orientation.

Once the processor 202 has determined one or more LPIs it transmits the LPI(s) to the controller 120. The controller 120 can adjust the lighting provided by the one or more illuminants 121 accordingly to improve the value of the LPI(s). For example, the controller 120 can determine from the LPIs that a task area in which the user 111 is working is not sufficiently lit. The controller 120 can then control one or more illuminants 121 which emit light into that task area to increase their light output.

To do so, the controller 120 may compare a received LPI with a corresponding user preference. The user preferences may be stored in memory 124. If the LPI indicates that the current value of one or more parameters (e.g. the overall or average brightness within the environment 110) is not equal to the user's preference for that parameter, then the controller 120 controls the illuminants 121 to adjust the brightness accordingly.

The user preferences may be associated with corresponding tolerances. The user tolerance for a given preference value is an indication of how likely the user 111 is to accept a given setting for that value. This is described in more detail below.

Some LPIs may be more specific. For example, an LPI might indicate that a particular task area (e.g. identified by a task area identification number) is under-lit. In order to remedy this, the controller 120 may access a database (e.g. memory 124) storing lighting system data. Here, "lighting system data" refers to information relating to the positions, and optionally orientations of, the illuminants 121 within the environment 110. Hence, in this example the controller 120 may access memory 124 in order to determine which illuminant 121 is arranged to illuminate the under-lit task area. The controller 120 can then control that illuminant to increase the brightness within that task area.

Whether or not the controller 120 determines to make a change to the illumination within the environment 110 may further depend on an activity currently being performed by the user 111. For example, if the user 111 is sleeping, the controller 120 may determine not to increase the brightness within the environment 110 even if a received LPI indicates that the brightness is "too low". In some examples, the current activity of the user 111 may be determined based on a predetermined schedule, e.g. stored in memory 124. In other examples, the current activity of the user 111 may be estimated based on input from one or more devices within the environment 110. Examples of such devices include a smart phone of the user 111 and a smart watch worn by the user 111. Data from the smart phone or smart watch may be accessible by the controller 120 (e.g. via the network 123, or directly e.g. via Bluetooth of WiFi). Data from the smart watch, smart phone, or other device may be used to determine a current activity of the user 111. For example, heart rate data from a smart watch can indicate that the user 111 is exercising or stressed, and application data from a smart phone can indicate that the user 111 is watching a video or reading messages or other content.

In additional or alternative examples, the current activity of the user 111 may be determined based on calendar or agenda data. Calendar or agenda entries can indicate whether the user 111 is, e.g. in a meeting. The environment 110 may be a room which can be booked by users, with data relating to the booking (e.g. start and end times, number of attendees, etc.) managed by a room reservation system. In such cases, data from the room reservation system could also be used to estimate the number of people in the environment 110. Data from the room reservation system could also be used to determine the user activity if it indicates, for example, whether a presentation, a conversation, a debate, etc. is ongoing.

In further additional or alternative examples, the current activity of the user 111 may be determined based on audio captured within the environment 110, e.g. using a microphone. In some specific examples, the current activity of the user 111 may relate to the user's mood or excitement. Techniques for determining a mood or excitement level from audio are known in the art.

The user preferences may be different for different activities or moods/excitement levels.

The controller 120 may be configured to update the user preferences in response to explicit or implicit input received from the user 111. This is described in more detail later below.

Some LPIs may take into account the subjective experience of the user 111. The subjective experience of the user 111 depends not only on the spectrum of the lighting provided by the illuminants 121, but also on the response of the human eye to those wavelengths. How the user 111 experiences the lighting within the environment 110 is therefore best described by luminance values. Luminance is a photometric measure of brightness in that it takes into account the sensitivity of the human eye. Hence, a luminance distribution indicating the perceived brightness (by the user 111) at different locations within the environment 110 is valuable information for the lighting system 100.

As part of determining one of more of the LPIs, the processor 202 of the camera unit 200 may therefore determine a luminance distribution from one or more images captured by the camera 201.

A method of determining a luminance distribution from one or more images captured by the camera 201 is first described. Later, various example LPIs are given. Where an LPI is described as requiring a luminance distribution, the luminance distribution may be determined from one or more images captured by the camera 201 (as described immediately below) or may be determined by an additional sensor and, for example, provided to the processor 202 via the communications interface 203.

The RGB values of the image(s) captured by the camera 201 may be transformed into a different colour space having luminance as one of the components, and typically two chrominance components as the other components. That is, a luminance value can be determined as a combination of RGB values. An example of a particularly advantageous colour space is the CIE XYZ colour space because it was developed to have a colour matching function which is analogous to the luminous sensitivity curve of the human eye for photopic vision $V(\lambda)$. The transformation from RGB to XYZ (or other) colour space may be done using conversion matrices which show a dependency to the colour primaries of the selected colour space and the white point applied by the camera 201. Hence, the luminance Y may be determined as a linear combination of the RGB values, as shown in Equation 1:

$$Y = r \cdot R + g \cdot G + b \cdot B \qquad \text{Equation 1}$$

where r, g, and b are weighting factors for the R, G, and B values, respectively, extracted from the transformation matrices.

The transformation (and therefore the weighting factors) used to properly map between the RGB space and the XYZ space or other space depend on the illumination under which the RGB image was captured (the spectral power distribution, SPD, of the illumination provided by the one or more illuminants 121). Prior art systems assume that the illumination is that of a standard illuminant having a known SPD. For example, for the sRGB colour space this is standard illuminant D65. Because of these assumptions, the prior art systems use fixed weighting factors r, g, and b for the transformation.

The present disclosure recognises that the prior art systems suffer from poor accuracy in converting to luminance values. This is because of a number of factors. Firstly, in the real world, the environment may be illuminated by a number of different types of illuminants with different SPDs. Secondly, the responsivity of the camera 201 may not perfectly match the standard, sRGB, spectral responsivities.

The present disclosure adapts the weighting factors for determining the luminance distribution from a given image depending on the SPD of the illuminant(s) present in the environment. By this method, more accurate luminance values can be determined by optimizing the weighting factors used in order to take into account the SPD. Methods described herein also account for deviations in the response of the camera 201 from the standard, sRGB spectral responsivities.

The task then is to determine values for r, g, and b which determine the most accurate luminance value Y from the RGB values of a given pixel in an image. This is designed to improve the spectral match and the performance of luminance distribution measurement. An example implementation is described in more detail below with reference to FIG. 4, following a discussion of the theory.

The relative spectral responsivity of the camera 201 $s_{rel}(\lambda)$ is defined as a linear combination of the individual responses of the red $R(\lambda)$, green $G(\lambda)$, and blue $B(\lambda)$ channels using, crucially, the same transformation coefficients as described above.

$$s_{rel}(\lambda) = (r \cdot R(\lambda) + g \cdot G(\lambda) + b \cdot B(\lambda)) \cdot k_{r,g,b} \qquad \text{Equation 2}$$

where $k_{r,g,b}$ is a calibration factor. The calibration factor is selected such that the integral of the luminosity function V is equal to the integral of the response of the camera $s_{rel}$ as shown in Equation 3.

$$1 = \frac{\int_{380\,nm}^{780\,nm} V(\lambda) d\lambda}{\int_{380\,nm}^{780\,nm} s_{rel}(\lambda) d\lambda} \qquad \text{Equation 3}$$

The choice of luminosity function V depends on the particular implementation. This is explained in more detail below in relation to non-visual effects. For the purposes of explanation, a typical luminosity function models the average spectral sensitivity of the human visual perception of brightness. One such luminosity function is the CIE photopic luminosity function $V(\lambda)$. Different luminosity functions may be used, as described in more detail below.

In any case, the total power detected by the camera 201 should equal that which would have been detected by a human eye from the image. Hence, to meaningfully compare the two, the response of the camera 201 is first scaled such that the total power detected by the camera 201 is equal to the total power which would have been detected by the human eye, as per equation 4.

$$s^*_{rel}(\lambda) = s_{rel}(\lambda) \cdot \frac{\int_{380\,nm}^{780\,nm} \Phi(\lambda) \cdot V(\lambda) d\lambda}{\int_{380\,nm}^{780\,nm} \Phi(\lambda) \cdot s_{rel}(\lambda) d\lambda} \qquad \text{Equation 4}$$

where s* is the scaled response of the camera and $\Phi$ is the SPD. The SPD may be determined in a variety of ways, as described in more detail below.

The scaled response of the camera 201 s* can then be directly compared with the human eye. The absolute value of the difference between the camera 201 and the human eye is a measure of the spectral mismatch, as shown in equation 5.

$$f'_1 = \frac{\int_{380\,nm}^{780\,nm} |s^*_{rel}(\lambda) - V(\lambda)| d\lambda}{\int_{380\,nm}^{780\,nm} V(\lambda) d\lambda} \qquad \text{Equation 5}$$

The weighting factors r, g, b are then determined such that the general spectral mismatch $f_1'$ is minimised, i.e. to find the set of values of r, g, and b which minimises the function $f_1'$, as shown in equation 6:

$$\arg\min f'_i, \text{ subject to: } \begin{cases} r \in (0, 1) \\ g \in (0, 1) \\ b \in (0, 1) \\ r + g + b = 1 \end{cases} \qquad \text{Equation 6}$$

The coefficients r, g, b determined by the above-described method may then be used to determine luminance values for each pixel in the image via Equation 1 given above. Hence, the image itself can be transformed into an array of luminance values representing the luminance distribution within the environment.

In an alternative example, the general spectral mismatch can be defined as the root mean square of the absolute difference between the luminosity function weighted by the SPD and the response of the camera weighted by the SPD, as shown in Equation 7.

$$\Delta \Phi_{RMS} = \sqrt{\frac{1}{780-380} \int_{380\,nm}^{780\,nm} |\Phi_n(\lambda) \cdot V(\lambda) - \Phi_n(\lambda) \cdot s_{rel}(\lambda)|^2 d\lambda} \quad \text{Equation 7}$$

However once the spectral mismatch is defined, the same process of minimising the spectral mismatch with subject to the constraints in Equation 6 apply. The resulting coefficient values (which minimise the spectral mismatch) can then be used to determine luminance values, as per Equation 1.

Note that in any of the above examples, one or more of the integrals may be calculated in a discrete fashion, e.g. for each 1 nm increment. Note also that the limits on the integrals are indicative of the visible spectrum for human vision and that therefore the given range, 380-780 nm, is only an example.

Figure 4:
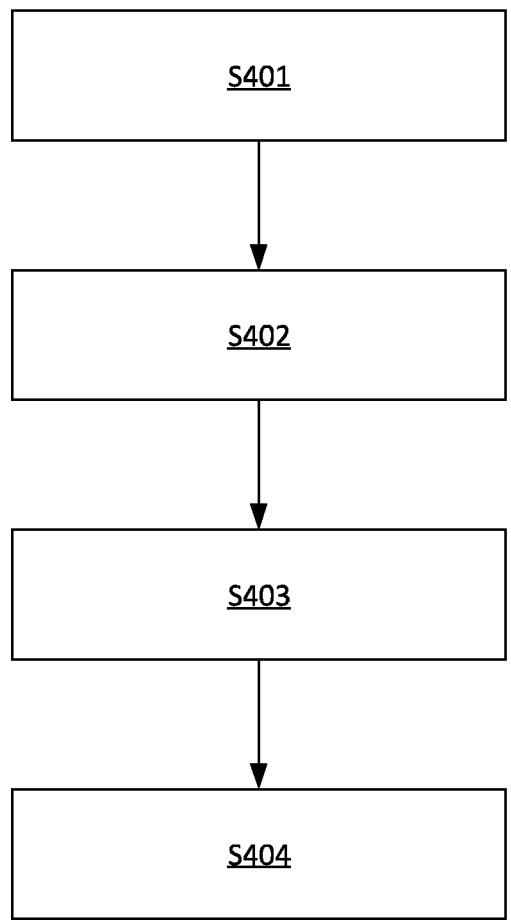
FIG. 4 shows schematically a flow chart illustrating an example method performed by a processor of the camera unit.

FIG. 4 is a flow chart illustrating an example method performed by the processor 202.

At S401, the processor 202 receives an RGB image from the camera 201.

At S402, the processor 202 identifies a spectral power distribution, SPD, of the illumination within the environment 101.

The spectral power distribution, SPD, is a representation of radiant power at each wavelength. The SPD of the illumination provided by the illuminant(s) 121 is required to determine the coefficients, as described above.

As mentioned above, the SPD of the illumination in the environment 101 affects the colour gamut captured by the camera 201. The gamut is to a certain extent related to the surface colours of the scene. For example, a scene captured under an incandescent lamp will provide a scene where the red values are expected to be higher, so the gamut is expected to be located around higher R values. Every light source is expected to have its own gamut, however, light sources with similar SPDs are expected to have very similar gamuts. This can be used to make a distinction between different light sources. Hence, based on the gamut of the scene, the SPD of the illuminants 121 can be estimated.

The memory 204 may store a set of predefined gamuts, each associated with a predefined SPD. The associations between the gamuts and SPDs may be determined in a commissioning process by capturing an image of an environment under illumination having a known SPD and determining the associated gamut from that captured image.

Hence, the processor 202 may identify the SPD by determining a gamut from the RGB image and accessing the memory 204 to identify a predefined gamut which most closely matches the determined gamut. The processor 202 may then use the SPD from memory 204 which is associated with the identified predefined gamut.

Note that if the environment is lit by light sources (e.g. illuminants 121, natural light, etc.) having multiple different SPDs, then the gamut will be affected by all the SPDs present. In other words, the SPDs of the sources of light within the environment 110 add together to produce an overall SPD. It is the overall SPD which will be estimated from the extracted gamut. Hence, the estimated predefined SPD (associated with the predefined gamut which is most similar to the extracted gamut) will be the predefined SPD which most closely matches the overall SPD.

For example, if the environment 110 is lit by a combination of 50% natural light and 50% LED illumination provided by the illuminants 121, then the overall SPD will be a combination of the SPD of the natural light and the LED illumination. Even if none of the predefined gamuts is associated with this exact type of lighting, the processor 202 will still determine the closest match.

The gamuts (both stored in memory 204 and determined from the RGB image) may be red-blue gamuts (gamuts based on the red and blue colour channels captured by the camera 201). Red-blue gamuts are particularly representative of the colours within the image and therefore work better than other gamuts (blue-green gamuts, green-red gamuts) for estimating the SPD.

The predefined gamuts are based on a set of SPDs that are most likely to be present in real life scenarios like LEDs, fluorescent lamps and daylight. For each SPD, the theoretical gamut is determined using the spectral responsivity of the camera. To estimate the light source of the scene, the captured gamut of the scene is compared with all predefined gamuts. Based on the correlation between the captured gamut and the predefined gamuts, the processor 202 determines which SPD is most likely or, in other words, which SPD has the highest probability. Which gamut from the memory 204 most closely matched the identified gamut may be determined using Bayesian estimation.

In another example, an indication of the SPD can be provided to the processor 202 by one of the illuminants 121 via the communications interface 203. The SPD indication can be defined in a commissioning process, e.g. during installation of the lighting system 100 or as step in the process of manufacturing the illuminant 121. In any case, the illuminant 121 is provided with a memory storing an indication of the SPD for that illuminant which may be provided to the processor 202. Alternatively, the SPD indication can be stored in another memory such as memory 124.

In yet another example, the SPD can be measured directly using an illuminance spectrophotometer.

At S403, the processor 202 determines values of the set of coefficients r, g, b for transforming the RGB values in the image into luminance values.

Based on the most likely SPD, the processor 202 determiners the weighting factors for R, G and B to most accurately calculate the luminance values in the distribution, as described above. The weighting factors are determined such that the general spectral mismatch of a combination of R, G and B is minimized as indicated in Equations 4 and 5, above. This means that the R, G and B values for a given pixel are combined such that the luminosity function weighted by the SPD is most closely approximated (see Equation 2). This optimization, indicated in Equation 6 or Equation 7, results in three weighting factors for R, G and B, that are used to most accurately calculate the corresponding luminance value.

At S404, the processor 202 uses the coefficient values from step S403 to determine the luminance distribution. This involves determining a luminance value for each pixel in the RGB image, or at least part of thereof, by taking a linear combination of the RGB values for that pixel having the determined coefficient values, as shown in Equation 8:

$$\text{Luminance} = k \cdot (r \cdot R + g \cdot G + b \cdot B) \quad \text{Equation 8}$$

This is performed for each individual pixel. The result is an image in the luminance channel comprising a luminance value for each pixel over an area, i.e. a luminance distribution. The area over which the luminance distribution is formed may comprise part or all of the area of the original input image or images.

This process can also be translated to other sensitivities in the visible part of the spectrum such as α-opics. This is described in more detail below.

Although the processor 202 can determine a luminance distribution from any RGB image using the method described above, in order to get a more accurate luminance distribution, it is preferable that the dynamic range of each pixel in the RGB image is as high as possible. One way of achieving this is to use High Dynamic Range, HDR, images.

A HDR image is constructed from multiple Low Dynamic Range, LDR, images captured using different exposures, e.g. using sequential exposure bracketing. The LDR images are merged into a single HDR image. The camera 201 is therefore in some examples configured to capture a plurality of LDR images of the environment 101. The processor 202 then combines these LDR images into a HDR image. The processor 202 can then use the HDR image in determining the luminance distribution, as described herein. That is, the linear combination is applied to the constructed HDR image.

The construction of the HDR image can be performed in parallel with the determination of the coefficients for the linear combination. This is explained below with reference to FIG. 5 which shows a flow chart illustrating an example method performed by the processor 202. In this example, the memory 204 stores a set of predefined colour gamuts, each associated with a respective SPD.

At S510, the processor 202 receives a set of LDR images from the camera 201. Each LDR image is an RGB image.

At S511, the processor 202 extracts a colour gamut from one or more of the received RGB images. For example, the processor 202 may extract the colour gamut from a first one of the LDR images. Alternatively, the processor 202 may extract a colour gamut from each of the LDR images and determine an average gamut.

At S512, the processor 202 identifies an SPD for use in determining the coefficients. To do so, the processor 202 accesses memory 204 to determine the predefined colour gamut which most closely matches the gamut extracted at S511. This may be done using Bayesian estimation. The SPD is assumed to be that which is associated with the colour gamut in memory 204 which most closely matches the colour gamut identified from the captured image. In other words, the SPD can be estimated by the processor 202 from the image captured by the camera 201. This is done using the insight that the SPD of the illumination provided by the illuminants 121 affects the colours captured by the camera 201.

At S513, the processor 202 determines the coefficients using the luminosity function and SPD, in the manner described above.

Figure 5:
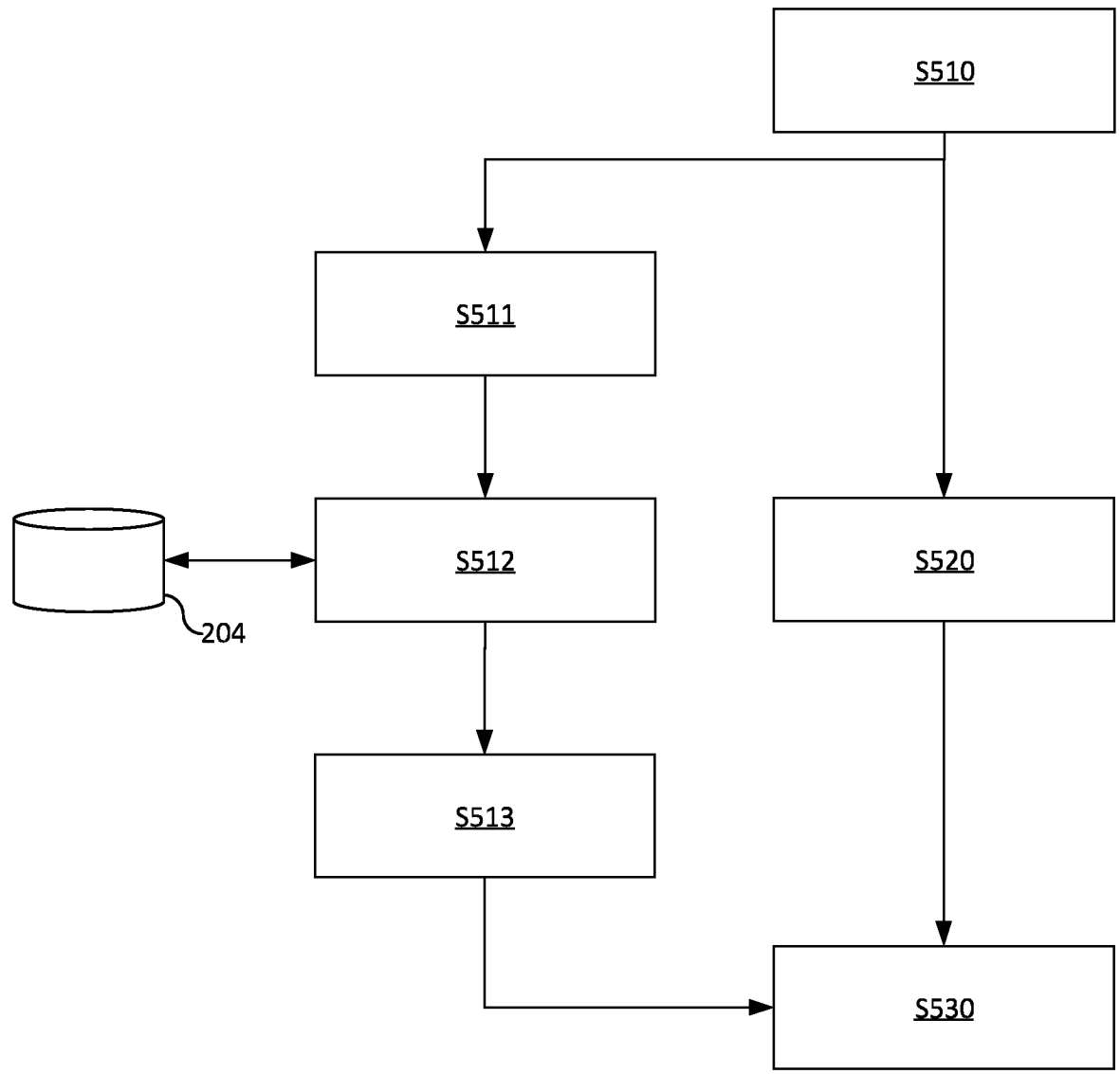
FIG. 5 shows schematically a flow chart illustrating another example method performed by the processor of the camera unit.

At S520, the processor 202 constructs the HDR image from the received LDR images. As shown in FIG. 5 and mentioned above, this is performed in parallel with the gamut extraction at S511, SPD identification at S512, and coefficient determination at S513. Due to this, the parallel tasks may be performed by separate controller modules. That is, it is appreciated that the processor 202 may be implemented as a first control module and a second control module. The first control module is configured to perform at least steps S511 to S513 and the second control module is configured to perform at least step S520. The control modules may be implemented by different processors. If privacy is not a concern, the control modules may be implemented anywhere in the lighting system 100. For example, the second control module may be implemented locally at the camera unit 200, while the first control module is implemented elsewhere in the lighting system 100 such as at a server.

At S530, the processor 202 determines the luminance distribution from the constructed HDR image using the determining coefficients.

Figure 6:
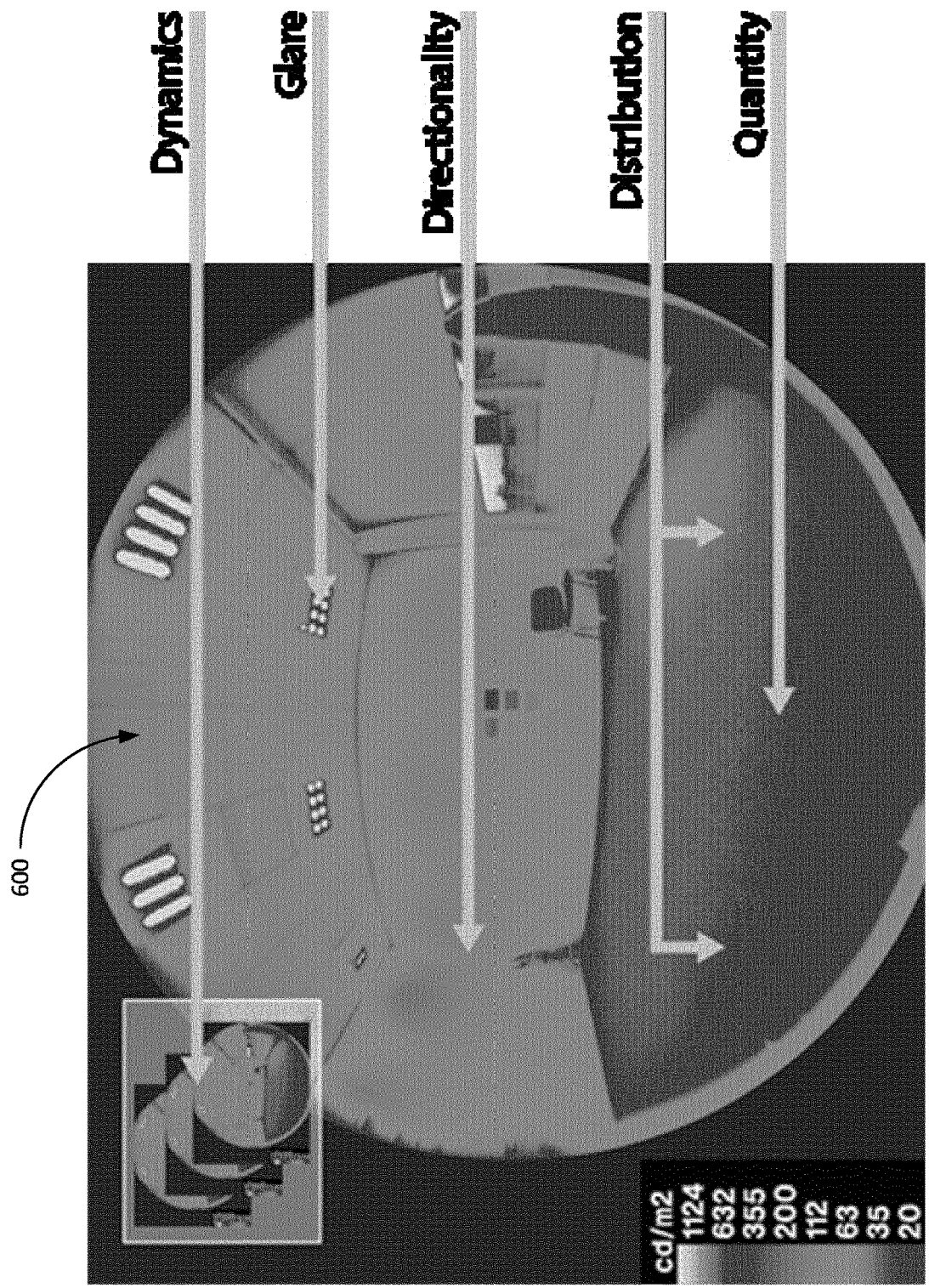
FIG. 6 illustrates an example luminance distribution of an environment determined from an image captured by a camera.

Prior art sensors applied in lighting control systems are generally able to provide only one piece of information: the illuminance for a certain point in space, i.e. a scalar value representing the illuminance within the field of view of the sensor. A luminance distribution, on the other hand, provides luminance values for an entire set of points covering an area or volume of space (each point in some or all of the captured image): a luminance distribution. FIG. 6 shows an example luminance distribution 600 of the environment 110 determined from an image captured by the camera 201 in the manner described above.

This information allows for a large range of valuable insights relating the perception of the user 111 within the environment 110, when compared with a single scalar value as provided by prior art sensors. To do so, according to embodiments disclosed herein, the processor 202 is configured to derive one or more Light Performance Indicators (LPIs) from the images captured by the camera 201. The LPI(s) relate to things like brightness, task area lighting level, non-visual effects, dynamics, etc. Each LPI is a combined metric derived from a plurality of pixels from the array of pixels in an image captured by the camera 201. As mentioned above, this may or may not involve first transforming each pixel into a luminance value.

Various examples of LPIs are now described.

Task area lighting level is an example of an LPI. The processor 202 may determine one or more task areas from images captured by the camera 201. For example, a task area may be the surface of a desk within the environment 110. From the luminance distribution, the processor 202 can then determine a luminance value present within the task area. In an example, the processor 202 may take an average luminance value over a portion of the luminance distribution which corresponds to the identified task area. For example, the processor 202 may identify the average illuminance value within each task area and provide the identified illuminances to the controller 120 along with an indication of the respective task area (e.g. task area 1 luminance=value 1; task area 2 luminance=value 2, etc.).

People tend to have a preference for a certain level of lighting on their task area, e.g. 300 or 500 lux. Hence, a task area lighting level LPI may be used by the controller 120 to determine that a task area is under or over lit (e.g. by comparing the determined task area lighting level with a target lighting level for that task area). The controller 120 may then control one or more corresponding illuminants 121 to increase or decrease the lighting level in that task area accordingly.

Figure 7:
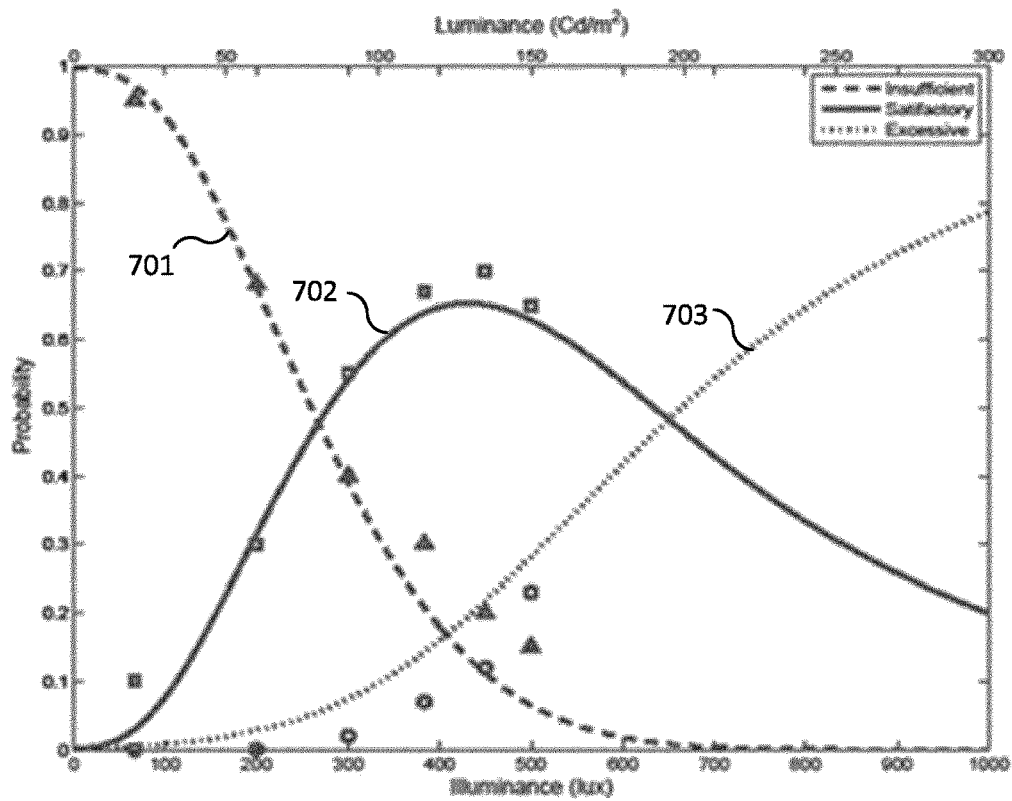
FIGS. 7 and 8 illustrate user preference data.
Figure 8:
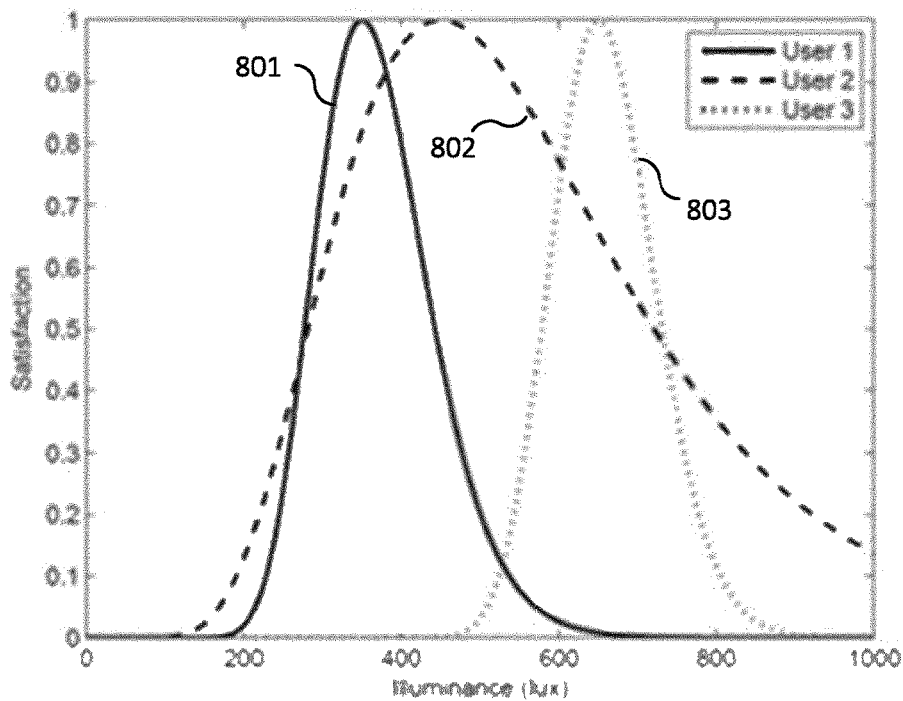

FIGS. 7 and 8 illustrate examples of user preference data as described above in relation to FIG. 3. Note that both illuminance and luminance values are shown. The illuminance can be extracted from the luminance if the reflectance of the surfaces in the environment 110 are known (assuming that the surfaces are Lambertian reflectors). The controller 120 may access the user preference data, e.g. from memory 124.

FIG. 7 relates to a single user. In FIG. 7, the probability of a given illuminance within the environment 110 being found insufficient 701, satisfactory 702, or excessive 703 by the user is shown.

The controller 120 may compare a received LPI with the user preference data in order to determine a user satisfaction level. The controller 120 may determine a user satisfaction level more multiple users and thereby determine an average or overall user satisfaction level.

FIG. 8 relates to the preferences of multiple (three in this example) users 801, 802, 803. The preference data for each user is represented as a curve having a maximum at their preferred illuminance and a width which is representative of their tolerance. For example, user 801 prefers a lower illuminance than user 803, but they have similar tolerances. User 802 prefers illuminance values between that of user 801 and user 803, but is more tolerant then the other two users 801, 803 to deviations from this preferred value.

When there are multiple users, the controller 120 may determine the user satisfaction based on the task area of that particular user. That is, the controller 120 may compare the current luminance value for a particular task area (as indicated in the received LPI) with the preference data for a user associated with that task (e.g. the user who works on that desk).

User preference data for values other than luminance may be represented and considered by the controller 120 in similar ways to those described above. For example, user preference data related to each user's satisfaction with different levels of contrast may be stored in memory 124.

Glare is another example of an LPI. The processor 202 may be configured to identify a (potential) source of glare from the luminance distribution. The processor 202 may then quantify the amount of glare experienced by the user 111. Glare is a function of glare source luminance and solid angle as viewed by the user 111, background luminance and the orientation of the user 111 with respect to the glare source. As an example, one useful definition of glare is the Unified Glare Rating. The unified glare rating (UGR) is a measure of the glare in a given environment, proposed by Sorensen in 1987 and adopted by the International Commission on Illumination (CIE). It is defined as in Equation 9:

$$URG = 8\log\frac{0.25}{L_b}\sum_n L_n^2 \frac{\omega_n}{p_n^2} \qquad \text{Equation 9}$$

where log is the logarithm base 10, $L_b$ is the background luminance, Ln is the luminance of each light source numbered n, $\omega_n$ is the solid angle of the light source seen from the observer and $p_n$ is the Guth position index, which depends on the distance from the line of sight of the user 111. Note that URG is given only as an example and that other metrics of glare may be used.

The processor 202 may determine a background luminance and a luminance of a source of glare from the luminance distribution itself.

The processor 202 may estimate the Guth position index or a deviation of the source of glare from a line of sight of the user 111 and the solid angle subtended by the source of glare using facial recognition and/or eye tracking techniques known in the art. In particular such techniques are known and are in use in the field of signage and interactive shop windows, where shop owners like to know which products are being watched by potential customers. For the purposes described herein, these techniques can be used to determine in which direction a user (e.g. user 111) is looking (his or her viewing angle). A glare LPI can then be determined using this viewing angle. Other LPIs which require information concerning a viewing angle of the user 111 may similarly use these techniques.

Glare is generally undesirable. Hence, the controller 120 may control one or more devices in the lighting system 100 so as to reduce the glare. For example, the controller 120 may do so in response to receiving an LPI indicating that the amount of glare experienced by the user 111 is above a threshold amount of glare. For example, the controller 120 may determine that an amount of glare coming off a computer screen of the user 111 is above a threshold amount. The controller 120 may, in response to this determination, control one or more devices of the lighting system 100 to remedy the excessive glare. This may be achieved by, for example, reducing the brightness setting of one or more illuminants 121 causing the glare.

The controller 120 may have additional functionality to intervene in the lighting control to reduce the glare by dimming or turning off one or more of the illuminants 121 which is/are causing the glare. If the glare is caused by a non-controllable light source (e.g. natural light from a window), then the controller 120 may control a different device in order to reduce the presence of this non-controllable light source. As an example, the controller 120 may deploy a blind or shade over a window through which natural light is entering the environment 100.

Glare values may be determined on a per-task area basis, using the techniques described above. That is, processor 202 may determine a glare value for each task area within the environment 110.

Uniformity (also called contrast) is another example of an LPI. "Uniformity" refers to changes in brightness across the distribution, i.e. variations in brightness over the image. Brightness may be determined based on the RGB values of the image. For example, the processor 202 may generate a contrast LPI indicating a difference or variation in brightness of a region of the image captured by the camera 201. A similar "luminance contrast" LPI may be generated from a luminance distribution.

As the techniques disclosed herein allow for a luminance distribution to be determined (as opposed to a single luminance value), in other examples, the processor 202 determines the uniformity of the luminance within the environment.

In other words, the processor 202 may be configured to analyse changes in brightness or luminance across the image. This allows the processor 202 to generate an LPI indicating areas of high contrast. The processor 202 may then transmit this LPI to the controller 120. The controller 120 may then identify whether the amount of non-uniformity is within an acceptable range. For example, the user preference data (e.g. from memory 124) may indicate the acceptable contrast ranges of one or more users. In general, too much contrast is distracting, but too little contrast is dull. The user preference data may be compared with the received contrast value to determine if the contrast is acceptable, too high, or too low. The controller 120 may be configured to control one or more devices in the lighting system 100 to make the contrast experienced by the one or more users more acceptable (i.e. increasing the contrast if it is too low, or decreasing the contrast if it is too high).

Uniformity of chromaticity is another example of an LPI. Large colour variations within an environment 110 are generally not desirable. For example, sunlight entering through a window 112 may have a different colour than artificial light from the illuminants 121. It is generally desirable to control the illuminants 121 to match the colour of the sunlight in order to create a uniform lighting atmosphere within the environment 110. Hence, the processor 202 may generate a colour contrast LPI indicating a difference or variation in colour of a region of the image captured by the camera 201.

The colour uniformity may be determined using similar techniques as described above in relation to brightness uniformity. Non-linear operations on the individual color channels are preferred to quantify the colour differences. The LPI preferably contains the absolute value or the square of these colour distances. For example, to calculate a colour distance, as an initial step a (non-linear) conversion is needed from RGB to an XY chromaticity location in the colour triangle. Colour distances can be obtained from the distance between the chromaticity locations of two differently lit areas.

The controller 120 may then control one or more devices within the lighting system 100 to improve the colour uniformity. For example, this may comprise controlling the illuminants 121 to change their colour output to more closely match that of the sunlight.

Other examples of LPIs relate to non-visual effects. It is well-known that illumination (and light in general) can affect the human body in non-visual ways. Examples include: acute effects such as alertness, melatonin suppression, pupillary reflex, brain activity, heart rate; circadian effects such as sleep-wake regulation; therapeutic effects such as depression and mood.

Note that the method described above for determining the luminance distribution involved the use of a luminosity function $V(\lambda)$. This luminosity function described the way in which human vision responds to different wavelengths of light. However the same technique can be used to model non-visual effects of the lighting within the environment 110.

Figure 9:
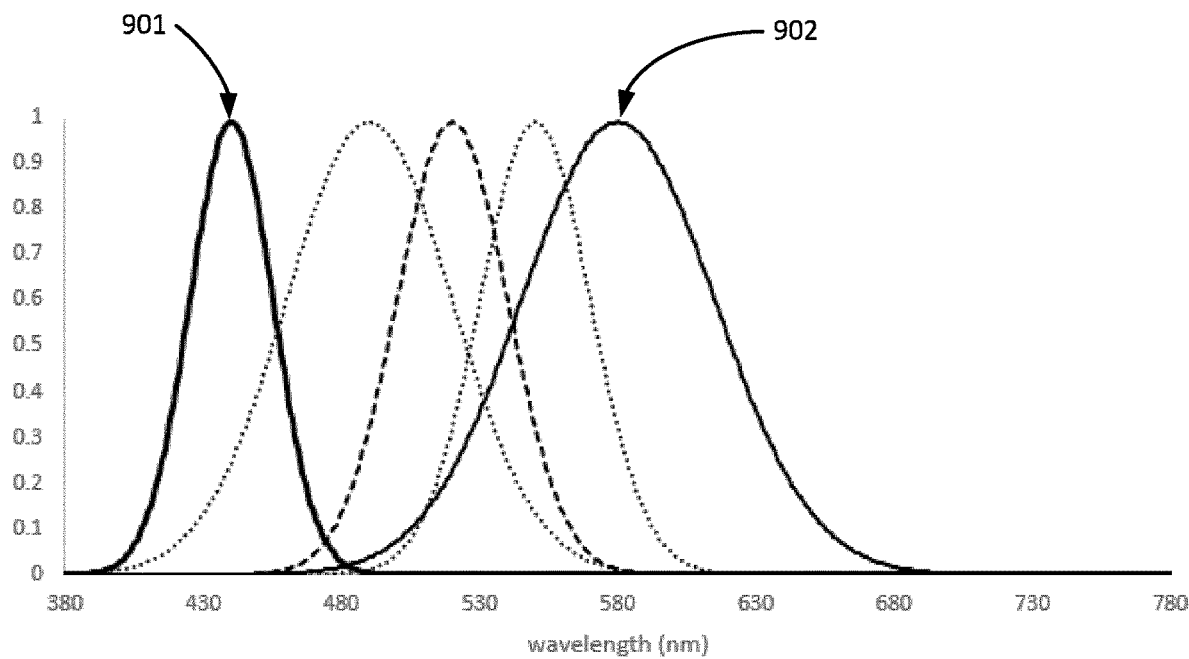
FIG. 9 illustrates example luminosity functions.

To do so, the luminosity function is simply replaced with a function representing the desired non-visual response of the human eye. Such a function is called an $\alpha$-opic action spectrum and represents the response of a different cell type in the human eye associated with a respective physiological effect. Examples of suitable functions include: melanopic radiance; s-cone-opic radiance; m-cone-opic radiance; l-cone-opic radiance; rhodopic radiance. FIG. 9 illustrates a few different examples of these functions. Each function relates to the response of a specific type of cell in the human eye and represents the relative strength of the effect associated with that type of cell for different wavelengths. For example, the physiological effect caused by cells of a first type having a response represented by function 901 is more responsive to shorter wavelengths than the physiological effect caused by cells of a second type having a response represented by function 902.

By using an $\alpha$-opic representative of a particular physiological effect, the strength of that effect induced on the user 111 by the current lighting within the environment 110 can be estimated. Hence, one or more LPIs may be a non-visual LPI indicating the estimated strength of a particular effect.

The estimated strength of an effect may be compared with a user preference for that effect in order to determine whether or not the current strength is acceptable. The user preference may be time-dependent. For example, the user preference may be for a lower melanopic effect in the evening than in the morning. The controller 120 may then control one or more devices in the lighting system 100 accordingly to adjust the effect. For example, the controller 120 may control the illuminants 121 to output less blue light in the evening in order to reduce a melanopic effect.

In other examples, an expected non-visual effect on a user can be estimated simply using a colour value from the image. For example, blue regions of the image may be assumed to generate a melanopic effect.

White colour is another example of an LPI. The colour can be described as a "colour temperature" which is the temperature of an ideal black-body radiator that radiates light of a colour which is comparable to that in the image. To calculate the colour temperature from an image captured by the camera 201, the processor 202 converts the RGB values to XYZ coordinates. These are converted into the standardized u,v color space and then a the non-linear mapping according to CIE 1960 UCS gives the Color Temperature.

In colour-tunable systems (i.e. lighting systems 100 in which the colour of the light output by the illuminants 121 is controllable), LPIs based on colour and colour differences contain such operations. In particular, the LPI can indicate whether or not the combination of the Colour Temperature and the luminance satisfy the Kruithof criterion. The (non-linear) Kruithof curve describes a region of illuminance levels and colour temperatures that are often viewed as comfortable or pleasing to an observer. In particular, the combination of cool light at low levels or high intensities of warm light are perceived as unpleasant.

Information such as the Kruithof curve describing acceptable combinations of illuminance and colour temperature can be stored in memory 124. The controller 120 may thereby compare a received LPI indicating a colour temperature and illuminance (these may be separate LPIs) with the acceptable combinations in order to determine whether or not the current combination is acceptable.

If the controller 120 determines that the current combination is not acceptable, it can initiate actions to lower or higher the colour temperature and/or the illuminance as appropriate to reach an acceptable value.

A further examples of an LPI can be taken from chronobiology. Human sleep is mainly regulated by two processes: the circadian pacemaker and the homeostatic sleep drive. Many mathematical models of the circadian pacemaker are known, e.g. the "Kronauer model". Exposure to light influences the human biological clock in a manner which can be described by a number of non-linear equations that depend on the moment of light expose relative to biological clock of the human subject. This may be simplified to a function of time of day when the light exposure is predictable (e.g. natural light being the main influence). Light exposure has a weighted impact on the human clock and in particular on sleep. This is typically referred to in the context of "light dose response curves". Hence, another example of an LPI is the impact of the illumination upon the biological clock of the user 111.

Another example of an LPI is a medical LPI relating to the impact of the illumination on the effectiveness of a drug. In studies on the effect of medications, the amount of light exposure is known to have an effect on the effectiveness of a dose of certain drugs. Hence, the processor 202 may be configured to determine an expected impact that the current lighting might have on the effectiveness of one or more drugs, and report these as LPIs. In further examples, the processor 202 may determine to what extent the current illumination will affect the effectiveness of a drug. The processor 202 may then indicate in an LPI a corresponding change to a dosage to counteract the change in effectiveness induced by the illumination. Alternatively, the controller 120 could perform this step upon receiving a medical LPI from the camera unit 200.

The one or more LPIs may be determined by the controller 202 at predefined time intervals, e.g. once a second, once every ten seconds, etc. To do so, the camera 201 is configured to capture images at predefined time intervals and provide them to the controller 202. The controller 202 can then be configured to determine corresponding luminance distributions for each of the images (or sets of images) received from the camera 201. The controller 220 may determine any of the above-mentioned LPIs from the dynamically determined luminance distributions.

Even when configured to capture multiple LDR images for use in constructing an HDR image, the camera 201 may also be similarly configured to capture images at a predefined time interval. In such cases, the predefined time interval may be longer than stated above, e.g. once every minute, once every five minutes, etc.

As mentioned above, an illustrated in FIG. 3, the controller 120 may update the user preference data in response to input from the user 111. The input may be explicit or implicit.

An example of explicit user input is the user 111 manually controlling one or more devices within the lighting system 100 to change one or more lighting conditions. For example, if the user 111 controls the illuminants 121 (e.g. using a switch on the wall or using a personal computing device connected to the controller 120 via the network 123) to increase their brightness, then the controller 120 may determine that the user 111 prefers brighter illumination. The controller 120 may then update the user preference data in the memory 124 accordingly.

Another example of explicit input is the user 111 explicitly indicating a satisfaction level with the current lighting conditions within the environment 110. For example, the user 111 may provide an indication of their satisfaction level to the controller 120 via the network 123 using a personal computing device such as a smartphone.

An example of implicit input is the user 111 not reacting in a negative manner to a change in a lighting setting, e.g. if the controller 120 increases the brightness within the environment 110 and the user 111 does not intervene to manually reduce the brightness, then the controller 120 may determine that the new brightness setting is acceptable to the user 111. I.e. the controller 120 may update the user brightness preference data in memory 124.

Various potential use cases are described below.

A first example use case is in a daylight glare probability, DGP, sunshading controller.

Automatic sun shadings are implemented in buildings more and more because they allow to improve the energy performance as well as the comfort. However, automatic shading device are notorious for causing discomfort by FALSE ONs and FALSE OFFs. Generally, these shading systems are controlled by a photocell placed on the roof of the building. First, the photocell is not placed at the most relevant location. Second, the photocell loses the spatial information by averaging a light that falls onto the sensor.

Glare is the most important reason why we want to apply shading. Therefore, embodiments use a DGP measurement device to control the sun shading. The DGP is based on a luminance distribution measurement, using low cost components as described herein, performed within the relevant room. The DGP can be extracted using appropriate software known in the art. When the glare is above a certain threshold the sun shading is activated.

As a result the sun shading is only activated when there is actual glare that is expected to bother the occupants of the room. Therefore, it is expected that there are less unnecessary movements of shading devices that cause discomfort.

A second example use case is as part of a lighting quality controller.

Lighting control systems tend to optimize the energy performance or a single lighting quality aspect (e.g. the illuminance on desktop). However, lighting quality has a number of aspects that are all relevant. Optimizing one single lighting quality aspects does not necessarily provide high quality lighting. The main problem is that not all aspects are easily measured and often they need different measurement devices.

It is recognized herein that a luminance distribution measurement device is able to extract information on multiple relevant lighting quality aspects simultaneously. Therefore, it would make an excellent sensor for a control system providing high quality lighting. When the sensor is placed in the room, the ceiling is most likely, a closed loop control system can be developed that is able to optimize the lighting such that it provides high quality lighting.

Instead of only optimizing the illuminance or the energy performance the light can be optimized for a combination of the quantity, glare, distribution, directionality, and dynamics of light. Enabling the control system to more accurately set the lighting conditions without being counter effective.

A third example use case is a desktop illuminance sensor.

Light sensors approximate the illuminance, to control the lighting, on the desktop by measuring the luminance of a small area. The luminance measurements are related to the illuminance using the reflection of the desktop. However, because the measurement area is very small it is not guaranteed that this area is representative for the whole desktop. This area might be covered, for instance, by a piece of paper having a completely different reflection than the desktop, introducing massive errors in the illuminance approximation. Which can result in changes in the actual illuminance on the desktop because the control system make the wrong choice based on wrong input.

Embodiments address this issue by using a luminance distribution measurement device. This means that the opening angle is greatly increased, and therefore the luminance of the entire desktop can be measured. Additionally, because the luminance distribution makes use of images, obstructions of the desktop can be recognized by image processing. By neglecting the obstructed areas the illuminance is only measured for the relevant area.

Based on this methodology, the illuminance is measured for the entire relevant area, without any obstructions, instead of small area that is not necessarily relevant. Consequently, the lighting can be more accurately provided by the control system.

A fourth example use case is wall luminance control.

Literature shows an influence of the luminance and uniformity from non-horizontal surfaces (e.g. wall) in our visual field on our visual and psychological assessments of an office space. Moreover, preferred light levels on the desktop are lower for non-uniform wall luminances. Including the wall luminance as a subject the lighting control system will therefore improve the comfort and energy performance. However, the wall has a large surface and is therefore not easily measured using current practice. As a results it cannot be included in the control systems.

In embodiments disclosed herein, the luminance distribution on the wall can be measured continuously using the camera unit 200. When the camera unit 200 is placed accordingly, most likely a vertical orientation, the wall luminance can be measured simultaneously with the desktop (il)luminance. This will provide continuous data that is relevant to the control system, closed loop, such that the energy can be limited by changing the wall luminance such that a lower illuminance on the desktop is allowed.

With the camera unit 200 all relevant content is measured at once. Based on the measurements the lit environment can be set such that the wall luminance allows the desktop illuminance to be lowered such that energy can be saved.

A fifth example use case relates to screen visibility.

More often operations are performed with robots controlled by the doctor. The doctor controls the robot based on live camera or X-ray information. It is very important that the doctor is able to see this information as good as possible. The images showed can be enhanced to improve visibility; however, improving the lit environment such that optimal conditions are provided for the doctor to see the images might be more effective.

To enhance the visibility of the images on a certain screen the luminous contrast should be optimized. Additionally, veiling reflections should be prevented. Both are aspects that can be measured with the camera unit 200. By developing a closed loop control system with the measurement data of the camera unit 200 and the images/video as input the conditions can be optimized such that the visibility of the screen is enhanced.

The improvements of the images has reached its limits, with a large investment a small increase in visibility can be achieved. Developing a closed loop system including the camera unit 200 can be more effective. Moreover, the camera unit 200 can also be used to optimize the lighting for different tasks in the operation theatre.

A sixth example use case is in occupancy-based dimming.

It is energy efficient to dim luminaires based on the occupancy. However, in open offices occupancy based dimming can cause annoyance by automatically switching or dimming luminaires when people leave or arrive.

It is recognized herein that energy can be saved while maintaining a high comfort level by dimming the background zones while maintaining a sufficient illumination for the work area. Using the camera unit 200, the luminances of the different areas can be measured simultaneously. So when an occupant leaves the light can be dimmed partly using the recommendations for background, surrounding and task area that are available.

An advantage is that all relevant areas can be measured, each occupant has its own areas; however, it can still be measured with only one measurement device. Moreover, the occupancy sensing could be included in the camera unit 200 measurements.

A seventh example use case is found in directional lighting for Non-Image-Forming, NIF, effects.

It is recognised herein that light coming from certain angle has a more stimulating effect on human beings. Some moments during the day stimulation is required, at other moments it is not, it is highly time dependent just as daylight is also time dependent. It is therefore a complicated problem to optimize the lighting and shading/reflections devices such that it achieves the required stimulation.

With the camera unit 200 the Non-Image-Forming (NIF) effects can be approximated. Similar to luminance pictures α-opic radiance maps can be determined for the entire space. Based on this the camera unit 200 could be implemented in a closed loop control system that optimizes the light such that upper half (giving the stimulation) of the images sensor (using a fish-eye lens) has a certain ratio related to the bottom half.

With the device also the luminance distribution can be measured simultaneously with the α-opics such that the stimulation effect can be optimized while the visual comfort is not negatively affected.

An eighth example use case is NIF (Non-Image-Forming) versus IF (Image-Forming) optimization The non-image and the image forming requirements vary during the day. However a ratio could be developed that captures the relation between the NIF and IF requirements for a certain time. Based on this ratio the lighting could be optimized such that the lighting is stimulating but not at the wrong moments while maintaining high quality lighting.

In embodiments, with the camera unit 200 the Non-Image-Forming (NIF) effects can be approximated. Similar to luminance pictures α-opic radiance maps can be determined for the entire space. Based on this the camera unit 200 could be implemented in a closed loop control system that optimizes the light according to the NIF IF ratio.

With the device also the luminance distribution can be measured simultaneously with the α-opics such that the stimulation effect can be optimized while the visual comfort is not negatively affected.

A ninth example use case is a two-sided lighting quality optimization.

For lighting quality, generally, only the visual aspects are considered. However, one could also distinguish high quality lighting for non-visual aspects. An issue is that visually high quality lighting does not necessarily provide non-visual quality. Therefore, it is difficult to optimize both.

Especially, the non-visual aspects are very time dependent, meaning that non-visual lighting quality is not relevant, or less relevant, for every moment during the day. Visual lighting is less time dependent. According to embodiments disclosed herein, based on the time it can be determined which type of lighting quality is the most relevant and, subsequently, this type is optimized. Lighting quality for both types can be determined using the camera unit 200.

With the camera unit 200 both qualities can be measured simultaneously, so only one devices is required for measuring a room or a certain area of a room. Moreover, because the device is placed within the room a closed loop setup can be developed, to improve the accuracy. Using this technology, the lighting can be controlled on many aspects that has not been feasible until know.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A method of determining a spatial luminance distribution over at least one image of a scene illuminated by at least one illuminant, the image comprising RGB values for each pixel, the method comprising:

forming a combination of the RGB values to determine the luminance distribution, the combination having a set of coefficients comprising a respective coefficient for each of the RGB values;

wherein the coefficients are determined by:

identifying a spectral power distribution, SPD, of the at least one illuminant; and determining values of the set of coefficients that minimize a spectral mismatch between: a) the identified SPD weighted by the combination; and b) the identified SPD weighted by a luminosity function.

2. The method according to claim 1, wherein the at least one image comprises a set of low dynamic range, LDR, images and the method comprises constructing a high dynamic range, HDR, image from the set of LDR images, and wherein the combination is applied to the constructed HDR image.

3. The method according to claim 1, wherein the identifying of the spectral power distribution comprises determining a gamut of the at least one image and comparing the determined gamut with a set of predefined gamuts for known spectral power distributions.

4. The method according to claim 3, wherein the gamuts are red-blue gamuts.

5. The method according to claim 1, wherein identifying the spectral power distribution comprises receiving a predetermined indication of the spectral power distribution.

6. The method according to claim 1, wherein the combination is a linear combination.

7. The method according to claim 1, comprising determining at least one Light Performance Indicator LPI from the luminance distribution, the LPI being a combined metric derived from an area of the luminance distribution.

8. The method according to claim 7, wherein at least one of the LPIs is a luminance LPI indicating a luminance value over an area of the luminance distribution.

9. The method according to claim 7, wherein at least one of the LPIs is a contrast LPI indicating a difference in luminance over an area of the luminance distribution.

10. The method according to claim 7, comprising identifying an orientation of a user, and wherein at least one of the LPIs is determined for an area of the luminance distribution corresponding to an area located in front of the user.

11. The method according to claim 7, wherein at least one of the LPIs is a glare LPI indicating an amount of glare experienced by a user, the method comprising determining the glare value by:

determining, from the luminance distribution, a background luminance and a luminance of a source of glare;

estimating a deviation of the source of glare from a line of sight of the user;

estimating a solid angle subtended by the source of glare from the user; and determining the amount of glare based on the background luminance, the luminance of the source of glare, the estimated deviation of the source of glare from the line of sight of the user, and the estimated solid angle subtended by the source of glare from the user.

12. The method according to claim 7, wherein at least one of the LPIs is a non-visual LPI indicating an expected non-visual effect on a user.

13. The method according to claim 7, comprising identifying a plurality of task areas within the luminance distribution, and determining an LPI for each respective task area.

14. A computer device comprising computer-executable code embodied on a non-transitory computer-readable storage medium configured so as when executed by one or more processors to perform the method according to claim 1.

15. A system comprising the computer device according to claim 14 and a camera.

* * * * *